United States Patent

Jeong

(10) Patent No.: US 9,616,803 B2
(45) Date of Patent: Apr. 11, 2017

(54) HEAD LIGHT MODULE

(71) Applicants: Hyundai Motor Company, Seoul (KR); Kia Motors Corporation, Seoul (KR)

(72) Inventor: Byeongho Jeong, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 74 days.

(21) Appl. No.: 14/485,223

(22) Filed: Sep. 12, 2014

(65) Prior Publication Data
US 2015/0070922 A1    Mar. 12, 2015

(30) Foreign Application Priority Data
Sep. 12, 2013    (KR) .................. 10-2013-0109866

(51) Int. Cl.
*B60Q 1/04* (2006.01)
*F21S 8/10* (2006.01)
*B60Q 1/00* (2006.01)
*F21Y 101/00* (2016.01)

(52) U.S. Cl.
CPC ......... *B60Q 1/0041* (2013.01); *B60Q 1/0052* (2013.01); *F21S 48/15* (2013.01); *F21S 48/215* (2013.01); *F21S 48/225* (2013.01); *F21S 48/2268* (2013.01); *F21Y 2101/00* (2013.01)

(58) Field of Classification Search
CPC .... F21S 48/10; F21S 48/1225; F21S 48/1241; F21S 48/1266; F21S 48/15; F21S 48/215; F21S 48/225; F21S 48/2268; B60Q 1/0041; B60Q 1/0052
See application file for complete search history.

(56) References Cited

U.S. PATENT DOCUMENTS

| 6,471,368 B1* | 10/2002 | Lin ................. B60Q 1/0052 362/216 |
| 7,168,833 B2 | 1/2007 | Schottland et al. |
| 7,611,271 B2* | 11/2009 | Meis .................. G02B 6/0006 362/551 |
| 2010/0157619 A1* | 6/2010 | Chinniah ............ G02B 6/001 362/551 |
| 2010/0254152 A1* | 10/2010 | Taleb-Bendiab ..... B60Q 1/0035 362/551 |
| 2012/0069592 A1* | 3/2012 | Natsume ............ B60Q 1/0052 362/511 |

FOREIGN PATENT DOCUMENTS

| JP | 2008-123718 A | 5/2008 |
| JP | 4735852 B2 | 5/2011 |
| KR | 10-0542058 B1 | 1/2006 |
| KR | 10-2010-0032980 A | 3/2010 |

* cited by examiner

*Primary Examiner* — Anh Mai
*Assistant Examiner* — Nathaniel Lee
(74) *Attorney, Agent, or Firm* — Morgan, Lewis & Bockius LLP

(57) ABSTRACT

A head light module may include a lamp that radiates light, a lens that directs the light radiated by the lamp to an outside, a light permeable bezel that is disposed in a predetermined area around the lens, and a surface illumination source that radiates light to a side end surface and a rear surface of the bezel. The light radiated by the surface illumination source is directed to a front surface of the bezel.

4 Claims, 5 Drawing Sheets

A-A

A-A

HEAD LIGHT MODULE

CROSS-REFERENCE TO RELATED APPLICATION

The present application claims priority of Korean Patent Application Number 10-2013-0109866 filed on Sep. 12, 2013, the entire contents of which application are incorporated herein for all purposes by this reference.

BACKGROUND OF INVENTION

Field of Invention

The present invention is related to a head light module that improves a product appearance and quality of a vehicle, and reduces cost and the number of components.

Description of Related Art

A head light module, also called a headlamp, is a device that serves to illuminate a forward path on which a vehicle runs, and requires brightness to enable a driver to verify obstacles on a road, which are 100 m from the front of the vehicle, at night.

A headlamp assembly of the related art (Japanese Patent Laid-Open Publication No. 2001-110213) includes a bulb (lamp), a reflector which supports the bulb and reflects forward light irradiated from the bulb, and a lens connected to a front side of the reflector by a holder.

Generally, a head light module of a vehicle includes a front light that emits light to a front side of a vehicle to make a visual field of a driver and a combination lamp that emits light to perform variety functions.

The combination lamp includes a front combination lamp and a rear combination lamp. The front combination lamp includes a head lamp, a turn signal lamp that is used during a right turn or a left turn, and a position lamp, and the rear combination lamp includes a rear lamp that is lighted during a back gear condition, a brake lamp that is lighted during a braking, and a tail lamp.

The combination lamp includes a light source that uses Light-Emitting Diode (LED) or bulb and a light guide that distributes luminous intensity to form various pattern.

Recently, surface illumination position lamp that uses plurality of LED lamps has been being applied, and the components like LED are increased, the area of the head lamp is extended, and the cost is also increased.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a head light module having advantages of improving appearance and quality of a vehicle through a bezel and a surface illumination source, reducing overall size, cost and the number of the components.

A head light module according to various aspects of the present invention may include a lamp that radiates light, a lens that directs the light radiated by the lamp to an outside, a light permeable bezel that is disposed in a predetermined area around the lens, and a surface illumination source that radiates light to a side end surface and a rear surface of the bezel, wherein the light radiated by the surface illumination source is directed to a front surface of the bezel.

The surface illumination source may include a LED. A light source groove may be formed at an end surface of the bezel, wherein the surface illumination source may be seated on the light source groove. A convex portion may be formed on the end surface to make the end surface convex.

A reflection layer may be formed on the rear surface of the bezel to reflect the light that is radiated from the surface illumination source toward a front side, wherein the reflection layer may include a protrusion. The protrusion may have a substantially sphere shape, and may have a size that depends on a distance between the protrusion and the surface illumination source, wherein the longer the distance, the smaller the size.

A color layer may be formed on the front surface of the bezel to form color, and the color layer is formed by a light permeable paint.

A light shield layer may be formed between the rear surface and the front surface of the bezel, wherein the light shield layer prevents the light radiated from the surface illumination source from transmitting to the rear surface of the bezel and directs the light radiated from the surface illumination source to the front surface of the bezel.

In a head light module according to the present invention, a surface illumination source is disposed at an end surface of a bezel, the light that is radiated from the surface illumination source passes an inner portion of the bezel to be radiated toward a front surface, such that small number of the surface illumination source is used to realize surface illumination effect.

Also, surface illumination effect is realized through new structure of the surface illumination source and the bezel, such that design level is improved and the size of overall module is reduced.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
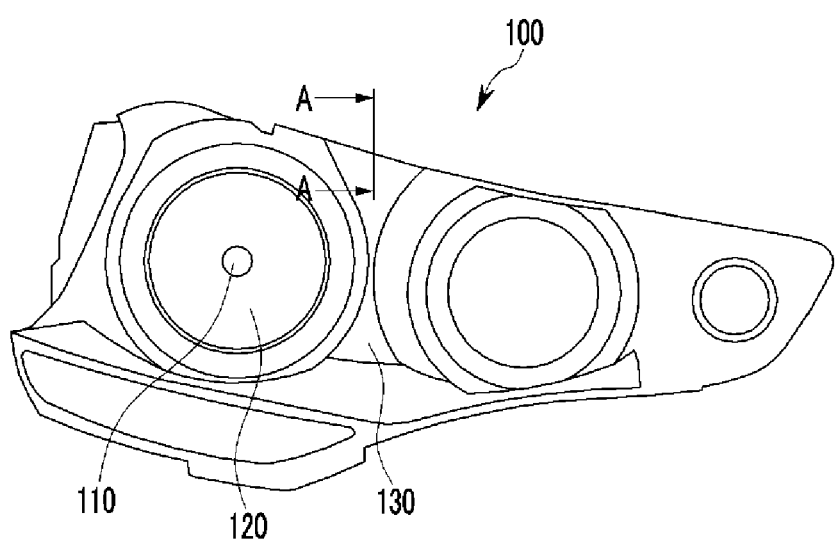
FIG. 1 is a partial front view of an exemplary head light module according to the present invention.

FIG. 1 is a partial front view of a head light module according to various embodiments of the present invention. Referring to FIG. 1, a head light module 100 includes a lamp 110, a lens 120, and a bezel 130. The lamp 110 performs radiating light, the lens 120 is disposed at the front of the lamp 110, and the light that is radiated from the lamp 110 passes the lens 120.

The bezel 130 according to various embodiments of the present invention is disposed around the lamp 110 and performs surface illumination function toward a front side of a vehicle. That is, a surface illumination source 200 like LED is disposed on an upper end surface, a side end surface, or a lower end surface of the bezel 130, the light that is radiated from the surface illumination source 200 passes the inner portion of the bezel 130 to be radiated toward a front side, and therefore the product quality and the design level of the head light module are improved and the cost is reduced.

Figure 2:
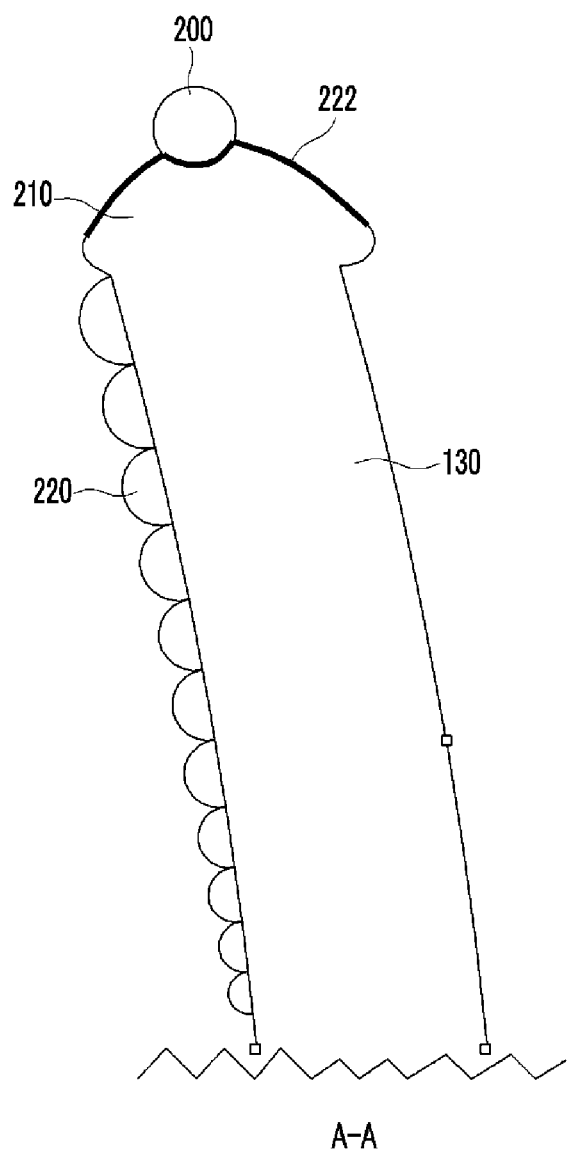
FIG. 2 is a partial cross-sectional view of the head light module along line A-A of FIG. 1.

FIG. 2 is a partial cross-sectional view of a head light module along line A-A of FIG. 1. Referring to FIG. 2, the surface illumination source 200 like LED is disposed on an end portion surface 222 of an upper end portion of the bezel 130, and the reflection layer 220 is formed on a rear surface of the bezel 130.

In various embodiments of the present invention, the reflection layer 220 includes a protrusion or protrusions of parabola shape or a sphere shape or of substantially parabola shape or substantially sphere shape. In some embodiments, if the protrusion is close to the surface illumination source 200, the protrusion is relatively larger, and if the protrusion is away from the surface illumination source 200, the protrusion is relatively smaller. Accordingly, the uniformity of the light that is radiated toward the front surface of the bezel 130 is improved.

A convex portion 210 is formed at an upper end portion of the bezel 130, and the surface illumination source 200 is disposed at a central portion of the convex portion 210. And, the light that is radiated from the surface illumination source 200 is radiated to an inner side of the bezel 130, is radiated to a front surface of the bezel 130, or is reflected from a rear surface of the bezel 130 to be radiated to a front surface of the bezel 130.

Figure 3:
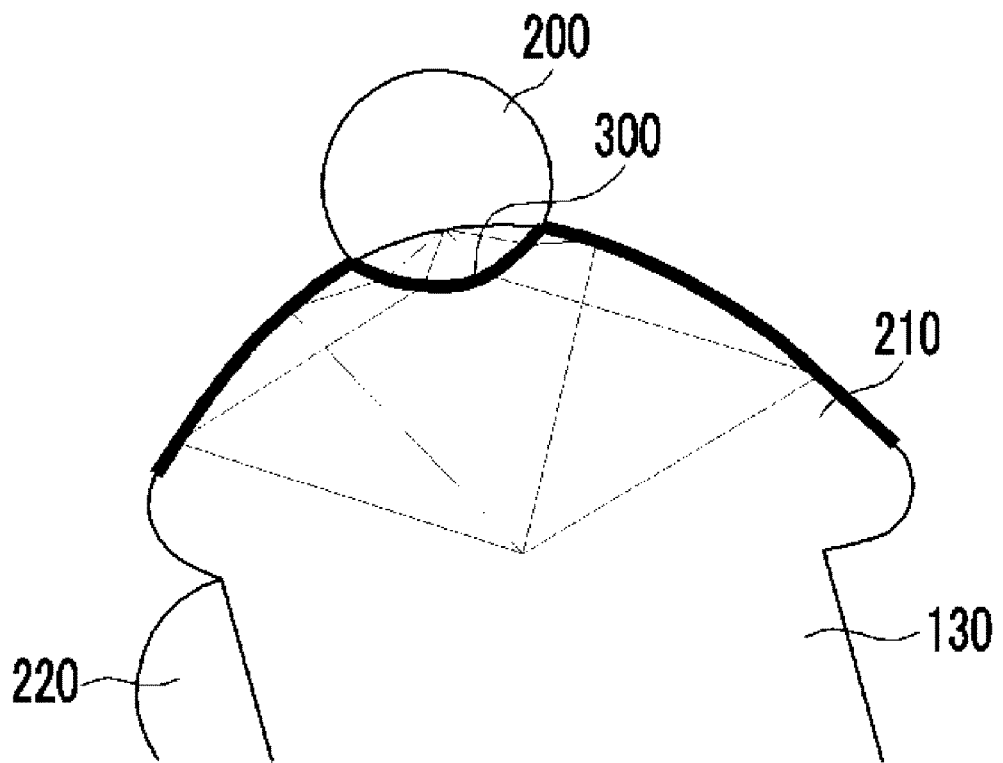
FIG. 3 is a partial detail cross-sectional view of an exemplary bezel according to the present invention.

FIG. 3 is a partial detail cross-sectional view of a bezel according to various embodiments of the present invention. Referring to FIG. 3, a convex portion 210 is formed at an upper end surface of the bezel 130, and a light source groove 300 on which the surface illumination source 200 is seated is formed at a central portion of the convex portion 210.

The light that is radiated from the surface illumination source 200 seated in the light source groove 300 is transferred to an inner side of the bezel 130. And, a part of the light that is radiated to an inner side of the bezel 130 is reflected from the convex portion 210 is radiated to an inner side of the bezel 130, a part of the light that is radiated to an inner side of the bezel 130 is reflected from the reflection layer of the rear surface to be radiated to a front surface of the bezel 130.

Figure 4:
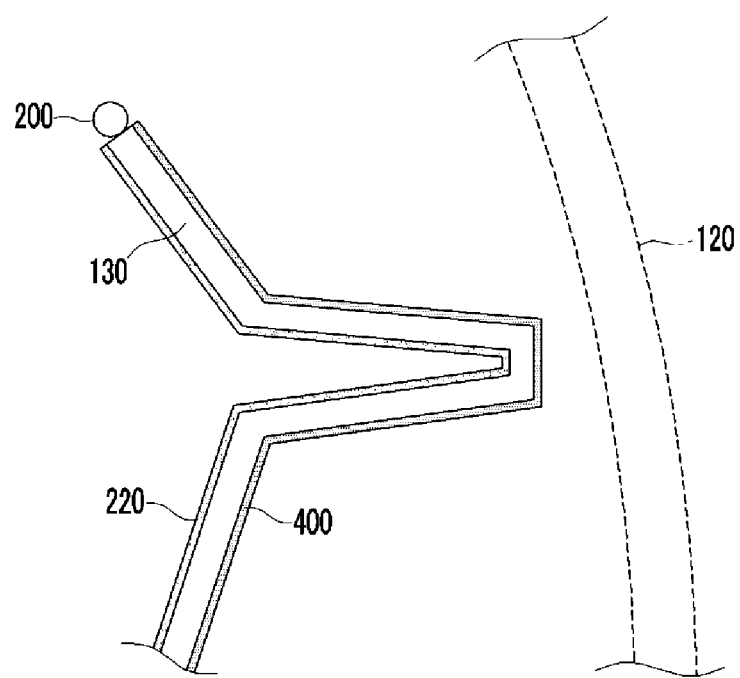
FIG. 4 is a schematic cross sectional side view of a bezel of an exemplary head light module according to the present invention.

FIG. 4 is a schematic cross sectional side view of a bezel of a head light module according to various embodiments of the present invention. Referring to FIG. 4, the surface illumination source 200 is disposed at an upper end portion of the bezel 130, a color layer 400 that forms color is formed on a front surface of the bezel 130, and the color layer can be formed by a light permeable paint. Here, the bezel 130 is made of a transparent material.

Further, a reflection layer 220 is formed on a rear surface of the bezel 130 to reflect the light that is radiated from the surface illumination source 200.

In various embodiments of the present invention, it is described that the surface illumination source 200 is disposed on an upper end portion of the bezel 130, but the source can be disposed at a lower end portion or a side end surface.

Figure 5:
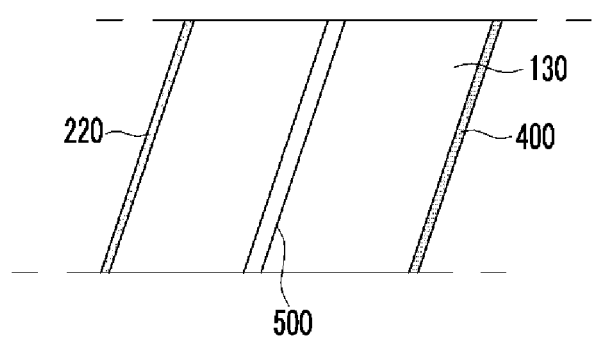
FIG. 5 is a partial cross-sectional view of a bezel of an exemplary head light module according to the present invention.

FIG. 5 is a partial cross-sectional view of a bezel of a head light module according to various embodiments of the present invention. Referring to FIG. 5, a color layer 400 is formed at a front surface of the bezel 130, a reflection layer 220 is formed at a rear surface, a light shield layer 500 is formed in an inner portion of the bezel, and the light shield layer 500 can be formed by paint or film. The light shield layer 500 prevents the light from transmitting to a rear surface and makes the light be radiated toward a front side.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A head light module, comprising:
   a lamp that radiates light;
   a lens that directs the light radiated by the lamp to an outside;
   a light permeable bezel that is disposed in a predetermined area around the lens; and
   a surface illumination source that radiates light to an end surface of the bezel, wherein the light radiated by the surface illumination source is directed to a front surface of the bezel,
   wherein a convex portion is formed on the end surface of the bezel to make the end surface convex and the convex portion has a curve shape,
   wherein a light shield layer is formed between a rear surface and the front surface of the bezel,
   wherein the light shield layer prevents the light radiated from the surface illumination source from transmitting to the rear surface of the bezel and directs the light radiated from the surface illumination source to the front surface of the bezel,
   wherein a reflection layer is formed on the rear surface of the bezel to reflect the light radiated from the surface illumination source toward a front side, wherein the reflection layer includes a protrusion,
   wherein the protrusion has a substantially spherical shape, and has a size that depends on a distance between the protrusion and the surface illumination source, wherein the longer the distance, the smaller the size, and wherein, when the protrusion is close to the surface illumination source, the protrusion is relatively larger, and when the protrusion is away from the surface illumination source, the protrusion is relatively smaller.

2. The head light module of claim 1, wherein the surface illumination source includes a LED.

3. The head light module of claim 1, wherein a light source groove is formed at the end surface of the bezel, wherein the surface illumination source is seated on the light source groove.

4. The head light module of claim 1, wherein a color layer is formed on the front surface of the bezel to form color, and the color layer is formed by a light permeable paint.

* * * * *